US010351788B1

(12) United States Patent
Singh et al.

(10) Patent No.: US 10,351,788 B1
(45) Date of Patent: Jul. 16, 2019

(54) PROCESSES AND APPARATUS FOR ISOMERIZING HYDROCARBONS

(71) Applicant: UOP LLC, Des Plaines, IL (US)

(72) Inventors: Pankaj Kumar Singh, New Delhi (IN); Avijit Basu, New Delhi (IN); Manoj Kumar, Haryana (IN); Mohamed S. M. Shakur, Hoffman Estates, IL (US); Rajaraman Panchapakesan, Haryana (IN)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/908,738

(22) Filed: Feb. 28, 2018

(51) Int. Cl.
C10G 67/00 (2006.01)
C07C 5/22 (2006.01)
B01J 19/24 (2006.01)

(52) U.S. Cl.
CPC .......... *C10G 67/00* (2013.01); *B01J 19/2445* (2013.01); *B01J 2219/24* (2013.01); *C10G 2300/1096* (2013.01)

(58) Field of Classification Search
CPC ......... C10G 67/00; C07C 5/22; C07C 5/2705; C07C 5/2702
See application file for complete search history.

(56) References Cited

U.S. PATENT DOCUMENTS

| 5,382,730 | A | 1/1995 | Breckenridge et al. |
| 7,223,898 | B2 | 5/2007 | Rice |
| 7,910,070 | B2* | 3/2011 | Zimmerman .......... C10G 35/00 208/133 |
| 8,513,480 | B2* | 8/2013 | Giyazov ................ C10G 45/00 585/736 |

FOREIGN PATENT DOCUMENTS

| EP | 400228 B1 | 4/1994 |
| EP | 1345914 A | 7/2002 |
| EP | 1992673 A1 | 11/2008 |
| FR | 2862311 A1 | 5/2005 |

(Continued)

OTHER PUBLICATIONS

Nocca et.al., Catacol(TM): A low cost reactive distillation technology for ether [(MTBE, ETBE, etc.)] production and for revamping existing units, Instituto Brasileiro de Petroleo—ARPEL et al. 5th Latin American Petroleum Congress/Conexpo ARPEL '96 (Rio de Janeiro Oct. 13-17, 1996) Paper N.TT-099 14P, Oct. 13, 1996.

(Continued)

*Primary Examiner* — Youngsul Jeong

(57) ABSTRACT

Processes and apparatus for isomerizing hydrocarbons are provided. The process comprises providing a feed stream comprising $C_5$, $C_6$ and $C_7+$ hydrocarbons. The feed stream is separated to produce a first stream rich in $C_5$ and $C_6$ hydrocarbons and a second stream rich in benzene and $C_7+$ hydrocarbons. The first stream is isomerized in the presence of isomerization catalyst and hydrogen in an isomerization zone under isomerization conditions to produce an isomerized stream. The second stream is contacted with a benzene saturation catalyst at benzene saturation conditions to produce a saturation effluent stream comprising cyclohexane.

14 Claims, 2 Drawing Sheets

(56) References Cited

FOREIGN PATENT DOCUMENTS

| WO | 1997048666 A1 | 12/1997 |
| WO | 1998003613 A1 | 1/1998 |
| WO | 02051821 A1 | 7/2002 |
| WO | 2013166235 A2 | 11/2013 |

OTHER PUBLICATIONS

Processing, compliance options can reduce cost of producing new gasoline, Oil & Gas Journal (ISSN 0030-1388) V92 N.28 63-64 (Jul. 11, 1994), v 92, n 28, p. 63-64, Jul. 11, 1994.
Jackson, HPin construction: Middle East: Indian Oil Corp. Ltd. (IOCL)..Hydrocarbon Processing, v 82, n 6, p. 41, Jun. 2003.
Issaadi et. al., Palladium-sulfated zirconium pillared montmorillonite: Catalytic evaluation in light naphtha hydroisomerization reaction, Catalysis Today, v 113, n 3/4, p. 174-177, Apr. 15, 2006.
Wagler, Optimising process performance, Petroleum Review, v 61, n 726, p. 28, Jul. 2007.
Bursian et.al., Production of Blending Components for Al-93 Gasoline by Isomerization of Hexane and Pentane/Hexane Cuts, Chemistry and Technology of Fuels and Oils, v 11, n 3-4, p. 259-263, Mar.-Apr. 1975.
International Search Report and Written Report from corresponding PCT application No. PCT/US2019/019998, dated Apr. 25, 2019.

\* cited by examiner

US 10,351,788 B1

PROCESSES AND APPARATUS FOR ISOMERIZING HYDROCARBONS

FIELD

The subject matter of the present disclosure generally relates to processes and apparatuses for isomerizing hydrocarbons. More particularly, the technical field relates to processes and apparatuses for separately isomerizing a stream containing $C_5$ and $C_6$ hydrocarbons, and separately processing the $C_7$ and higher hydrocarbons to retain the $C_7$ components.

BACKGROUND

Hydrocarbon streams are refined through various unit operations to produce various types of fuel, industrial raw materials that are employed in production of other compounds or products, and petroleum-based products. Production of gasoline is a particularly important industrial process involving refining of hydrocarbons through various unit operations, including isomerization and catalytic reforming. Reforming of hydrocarbons is useful to convert paraffins to aromatic compounds in the presence of noble metal catalysts. Aromatic compounds provide high octane value and, thus, are desirable components in gasoline. Isomerization is effective to convert linear hydrocarbons into branched hydrocarbons, which have a higher octane value than linear compounds but a lower octane value than aromatic compounds. Isomerized streams (or isomerate) is substantially free of aromatic compounds, whereas reformate streams (or reformate) generally include high quantities of aromatic compounds (e.g., at least 50 wt %).

During refining, a hydrocarbon stream is generally separated into various streams based on the number of carbon atoms of compounds within each stream. Hydrocarbons having 7 or more carbon atoms are generally subject to reforming because reforming generally results in higher octane value than isomerization of these hydrocarbons. Hydrocarbons having 5 or 6 carbon atoms are generally subjected to isomerization.

Modern specifications for gasoline typically place limits on aromatic content. The limits on aromatic content restrict the amount of reformate that can be blended into the gasoline. Since refineries generally produce significantly more hydrocarbons having 7 or more carbon atoms, there is typically too much reformate produced relative to isomerate for cases where aromatics are highly restricted in gasoline. Hydrocarbons having 7 carbon atoms cannot be effectively isomerized with hydrocarbons having 5 or 6 carbon atoms, since hydrocarbons having 7 carbon atoms are subjected to cracking under conditions necessary to effectively isomerize hydrocarbons having 5 or 6 carbon atoms, resulting lower isomerate yield and higher hydrogen consumption.

Also, in cases when the isomerate octane requirement is not very high, it is desirable to retain the $C_6$ rings across the Isomerization reactor rather than open these to convert into high octane components.

Accordingly, it is desirable to provide apparatuses and processes for isomerizing hydrocarbons that enable achieving higher liquid yield from the $C_5/C_6$ Isomerization Unit. Further, it is desirable to provide apparatuses and processes for isomerizing hydrocarbons having lower hydrogen consumption. Furthermore, other desirable features and characteristics of the present subject matter will become apparent from the subsequent detailed description of the subject matter and the appended claims, taken in conjunction with the accompanying drawings and this background of the subject matter.

SUMMARY

Various embodiments contemplated herein relate to processes and apparatuses for isomerizing hydrocarbons. The exemplary embodiments taught herein achieve higher liquid yield from the $C_5/C_6$ Isomerization zone and lower hydrogen consumption in processes and apparatus for isomerizing hydrocarbons.

In accordance with an exemplary embodiment, a process is provided for isomerizing hydrocarbons. The process comprises providing a feed stream comprising $C_5$, $C_6$ and $C_7+$ hydrocarbons. The feed stream is separated to produce a first stream rich in $C_5$ and $C_6$ hydrocarbons and a second stream rich in benzene and $C_7+$ hydrocarbons. The first stream is isomerized in the presence of isomerization catalyst and hydrogen in an isomerization zone under isomerization conditions to produce an isomerized stream. The second stream is contacted with a benzene saturation catalyst at benzene saturation conditions to produce a saturation effluent stream comprising cyclohexane.

In accordance with another exemplary embodiment, a process is provided for isomerizing hydrocarbons. The process comprises providing a feed stream comprising $C_5$, $C_6$ and $C_7+$ hydrocarbons. The feed stream is separated to produce a first stream rich in $C_5$ and $C_6$ hydrocarbons and a second stream rich in benzene and $C_7+$ hydrocarbons. The first stream is isomerized in the presence of isomerization catalyst and hydrogen in an isomerization zone under isomerization conditions to produce an isomerized stream. The isomerized stream is passed to a stabilizer to provide a stabilizer overhead stream comprising $C_4-$ hydrocarbons and a stabilizer bottoms stream comprising branched hydrocarbons. The second stream is contacted with a benzene saturation catalyst at benzene saturation conditions to produce a saturation effluent stream comprising cyclohexane. The saturation effluent stream is passed to a stripper to provide a stripper overhead stream and a stripper bottoms stream. At least a portion of the stripper bottoms stream and the stabilizer bottoms stream are passed to a de-isohexanizer column to provide an isomerate product and a de-isohexanizer side draw stream comprising cyclo-hexanes. The de-isohexanizer side draw stream is passed from the de-isohexanizer column to the isomerization zone.

In accordance with yet another exemplary embodiment, an apparatus is provided for isomerizing hydrocarbons. The apparatus comprises a separation column in fluid communication with a feed stream comprising $C_5$, $C_6$ and $C_7+$ hydrocarbons to provide a first stream rich in $C_5$ and $C_6$ hydrocarbons in a first line and a second stream rich in benzene and $C_7+$ hydrocarbons in a second line. An isomerization zone is in fluid communication with the first line for isomerizing the first stream in the presence of isomerization catalyst and hydrogen under isomerization conditions to produce an isomerized stream in an isomerate line. A benzene saturation reactor is in fluid communication with the second line for contacting the second stream with a benzene saturation catalyst at benzene saturation conditions to produce a saturation effluent stream in a saturation effluent line comprising cyclohexane.

The disclosed subject matter allows achieving higher liquid yield from the $C_5/C_6$ isomerization zone and lower hydrogen consumption by retaining the $C_6$ rings across the isomerization zone, rather than open these to convert into high octane components.

These and other features, aspects, and advantages of the present disclosure will become better understood upon consideration of the following detailed description, drawing and appended claims.

BRIEF DESCRIPTION OF THE DRAWINGS

The various embodiments will hereinafter be described in conjunction with the following drawing figures, wherein like numerals denote like elements, and wherein.

Figure 1:
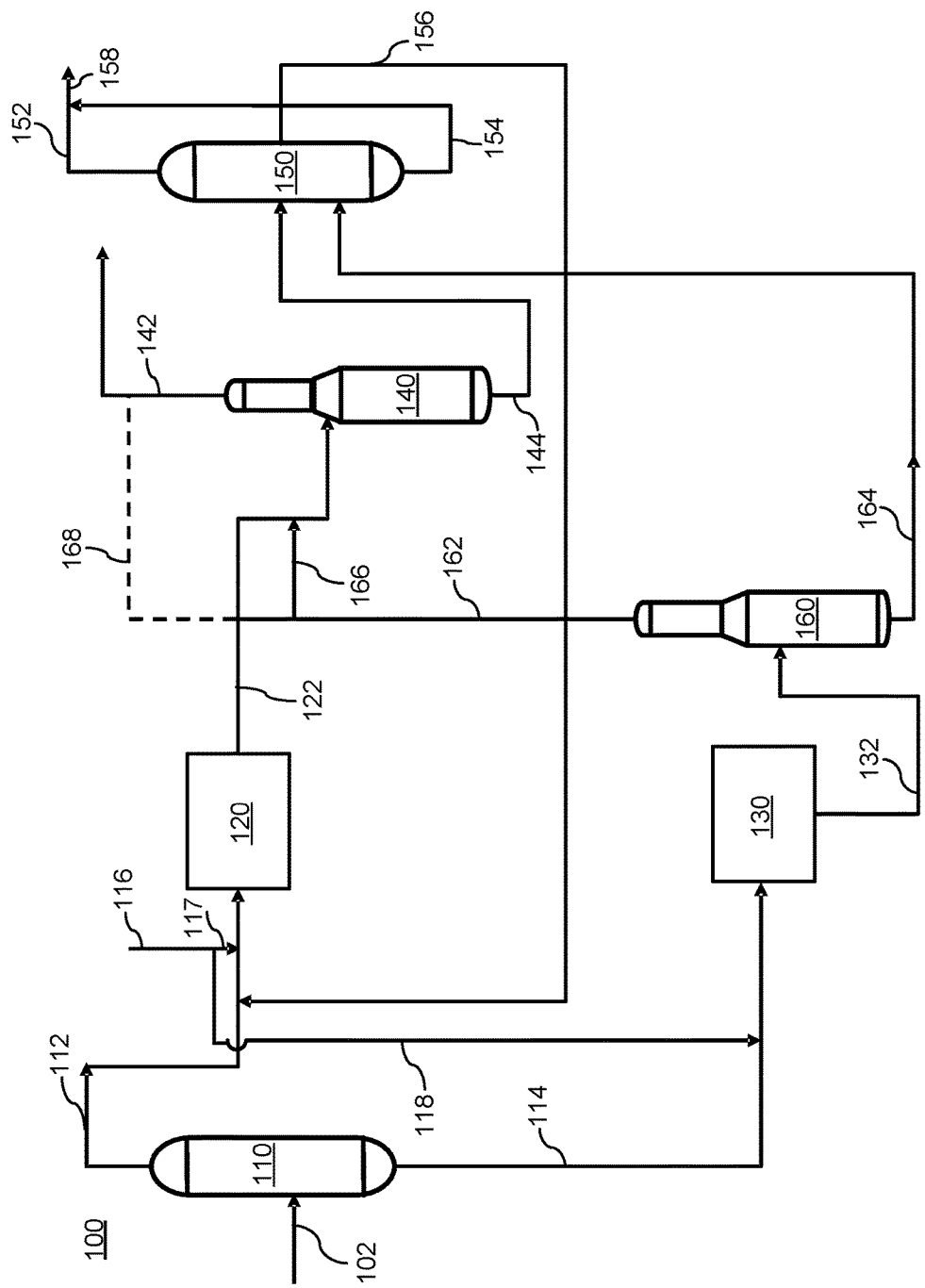
FIG. 1 is a schematic diagram of a process and an apparatus for isomerizing hydrocarbons in accordance with an exemplary embodiment.

Skilled artisans will appreciate that elements in the FIGURES are illustrated for simplicity and clarity and have not necessarily been drawn to scale. For example, the dimensions of some of the elements in the FIGURES may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

As depicted, process flow lines in the figures can be referred to, interchangeably, as, e.g., lines, pipes, branches, distributors, streams, effluents, feeds, products, portions, catalysts, withdrawals, recycles, suctions, discharges, and caustics.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "stream" can include various hydrocarbon molecules and other substances. Moreover, the term "stream comprising Cx hydrocarbons" can include a stream comprising hydrocarbon with "x" number of carbon atoms, suitably a stream with a majority of hydrocarbons with "x" number of carbon atoms and preferably a stream with at least 75 wt % hydrocarbon molecules, respectively, with "x" number of carbon atoms. Moreover, the term "stream comprising Cx+ hydrocarbons" can include a stream comprising a majority of hydrocarbon molecules, with more than or equal to "x" carbon atoms and suitably less than 10 wt % and preferably less than 1 wt % hydrocarbon molecules, with x−1 carbon atoms. Lastly, the term "Cx− stream" can include a stream comprising a majority of hydrocarbon molecules with less than or equal to "x" carbon atoms and suitably less than 10 wt % and preferably less than 1 wt % hydrocarbon molecules, with x+1 carbon atoms.

The term "column" means a distillation column or columns for separating one or more components of different volatilities. Unless otherwise indicated, each column includes a condenser on an overhead of the column to condense the overhead vapor and reflux a portion of an overhead stream back to the top of the column. Also included is a reboiler at a bottom of the column to vaporize and send a portion of a bottom stream back to the bottom of the column to supply fractionation energy. Feeds to the columns may be preheated. The top pressure is the pressure of the overhead vapor at the outlet of the column. The bottom temperature is the liquid bottom outlet temperature. Overhead lines and bottom lines refer to the net lines from the column downstream of the reflux or reboil to the column.

As used herein, the term "overhead stream" can mean a stream withdrawn at or near a top of a vessel, such as a column.

As used herein, the term "bottoms stream" can mean a stream withdrawn at or near a bottom of a vessel, such as a column.

As used herein, the term "rich" can mean an amount of generally at least about 75%, preferably about 85%, and optimally about 95%, by mole, of a compound or class of compounds in a stream.

As used herein, the term "predominantly" can mean an amount of generally at least about 90%, preferably about 95%, and optimally about 99%, by mole, of a compound or class of compounds in a stream.

An exemplary embodiment of the process and apparatus for isomerizing hydrocarbons is addressed with reference to a process and apparatus 100 according to an embodiment as shown in FIG. 1. The process and apparatus 100 includes a separation column 110, an isomerization zone 120, a benzene saturation reactor 130, a stabilizer 140, a deisohexanizer column 150 and a stripper 160.

In accordance with an exemplary embodiment as shown in FIG. 1, a feed stream in line 102 may be passed to the separation column 110. The feed stream may be a feed stream comprising $C_5$, $C_6$ and $C_7$+ hydrocarbons. In one embodiment, the feed stream may include predominantly $C_5$ and $C_6$ hydrocarbons. In another embodiment, the feed stream may include $C_7$+ hydrocarbons in the range of about 2 to about 20 wt %, or about 2 to about 10 wt %. As shown in the FIG. 1, the feed stream may be separated in the separation column 110 to produce a first stream in a first line 112 rich in $C_5$ and $C_6$ hydrocarbons and a second stream in a second line 114 rich in benzene and $C_7$ hydrocarbons. In the instant embodiment, the separation column may be a splitter column and hence may be interchangeably referred to as the splitter column 110. The first line may be obtained from an overhead of the splitter column 110 and the second line may be obtained from a bottom of the splitter column 110.

The first stream withdrawn in line 112 may be passed to the isomerization zone 120 and the second stream withdrawn in line 114 may be passed to the benzene saturation reactor 130. The isomerization zone 120 may include one or more reactors. The isomerization zone can operate at any suitable temperature, such as a temperature of about 90° C. to about 235° C., preferably about 110° C. to about 205° C., and the pressure can be about 700 to about 7,000 KPa. The liquid hourly space velocities may range from about 0.5 to about 12 $hr^{-1}$. The catalyst used in the isomerization zone may include a strong acid catalyst, such as at least one of a chlorided platinum alumina, a crystalline aluminosilicate or zeolite, a sulfated zirconia, and a modified sulfated zirconia, preferably at least one of a chlorided platinum alumina or a sulfated zirconia. As a class, the crystalline aluminosilicate or crystalline zeolite catalyst may include a crystalline zeolitic molecular sieve having an apparent pore diameter large enough to adsorb neopentane. Generally, the catalyst may have a silica alumina molar ratio $SiO_2:Al_2O_3$ of greater than about 3:1 and less than about 60:1, and preferably about 15:1 to about 30:1. Catalysts of this type for isomerization and methods for preparation are disclosed in, e.g., U.S. Pat. No. 7,223,898.

As shown, a hydrogen make-up gas stream in line 116 may be split to provide a first make-up gas stream in line 117 and a second make-up gas stream in line 118. The hydrogen make-up gas stream in line 117 may be introduced to the first stream and passed to the isomerization zone 120. Additionally, a de-isohexanizer side draw stream in line 156 comprising cyclo-hexanes, linear hexane, cyclic hydrocarbons and monomethyl-branched pentane, from the de-isohexanizer column 150 may also be passed to the isomerization zone 120. The first stream is isomerized in the presence of isomerization catalyst and hydrogen in the isomerization zone 120 under isomerization conditions to produce an isomerized stream in line 122. The isomerized stream may be passed to a stabilizer column 140 to provide a stabilizer overhead stream in line 142 comprising $C_4$– hydrocarbons and a stabilizer bottoms stream in line 144 comprising branched hydrocarbons.

Referring back to the second stream, the second stream comprising $C_7$ hydrocarbons and benzene is contacted with a benzene saturation catalyst at benzene saturation conditions in the benzene saturation reactor 130 to produce a saturation effluent stream in line 132 comprising cyclohexane. The second stream is contacted with a benzene saturation catalyst at benzene saturation conditions in the benzene saturation reactor 130 to produce the saturation effluent stream in line 132. The benzene saturation conditions includes a temperature from about 130° C. to about 160° C. and a pressure from about 1400 KPa to about 2500 KPa, or from 1700 KPa to 2200 KPa. In various embodiments, hydrogen may be provided in desired amounts to an inlet of the benzene saturation reactor 130. Examples of benzene saturation catalysts include platinum group, tin or cobalt and molybdenum metals on suitable refractory inorganic oxide supports such as alumina. In one embodiment, the alumina is an anhydrous gamma-alumina with a high degree of purity. The term platinum group metals refer to noble metals excluding silver and gold which are selected from the group consisting of platinum, palladium, germanium, ruthenium, rhodium, osmium, and iridium.

The saturation effluent stream in line 132 may be passed to the stripper 160 to provide a stripper overhead stream in line 162 and a stripper bottoms stream in line 164. At least a portion of the stripper overhead stream may be passed to the stabilizer column 140. As shown in FIG. 1, a portion of the stripper overhead stream in line 166 may be mixed with the isomerized stream and passed to the stabilizer column 140. In one embodiment, a portion of the stripper overhead stream in line 168 may be passed to mix with the stabilizer overhead stream.

The stripper 160 may have an independent condensing system or may be sent to the common stabilizer of isomerization zone which will help to avoid the separate condenser, receiver and reflux system in the stripper 160. In an embodiment, the stripper 160 has an independent condensing system. One advantage of having separate condensing system for the stripper is, that a separate feed dryer is not required for the feed going to the benzene saturation reactor 130 and hence resulting in savings in capital expenditure.

The stabilizer bottoms stream in line 144 may be passed to the de-isohexanizer column 150 to provide an isomerate product. Further, at least a portion of the stripper bottoms stream may be passed to the de-isohexanizer column 150. The de-isohexanizer column 150 may be a packed or trayed column and typically operates with a top pressure of from 50 to 500 kPa (gauge) and a bottom temperature of from 75° C. to 170° C. Applicants have found that sending a portion of the stripper bottoms stream to the de-isohexanizer column helps recovering some of the $C_6$ cyclics present in the stripper bottoms stream through the de-isohexanizer side draw stream in line 156 which will may be recycled back to the isomerization zone 120 for octane boost of overall isomerate product. In the exemplary process as described, $C_6$ cyclics recovery in the de-isohexanizer side draw can be adjusted accordingly. In an embodiment, the portion of the stripper bottoms stream may be passed to the de-isohexanizer column 150 at a lower feed entry i.e. below the side cut tray. In an exemplary embodiment as shown in the FIG. 1, the stripper bottoms stream in line 164 may be passed to the de-isohexanizer column 150. A de-isohexanizer overhead stream in line 152, the de-isohexanizer side draw stream in line 156 and a de-isohexanizer bottoms stream in line 154 may be withdrawn from the de-isohexanizer column. The de-isohexanizer overhead stream in line 152 and de-isohexanizer bottoms stream in line 154 may be mixed to provide the isomerate product in line 158. In another embodiment, a portion of stripper bottoms stream may be passed to blend with the isomerate product in line 158. Further, as disused above, the de-isohexanizer side-draw stream may be passed to the isomerization zone 120.

Figure 2:
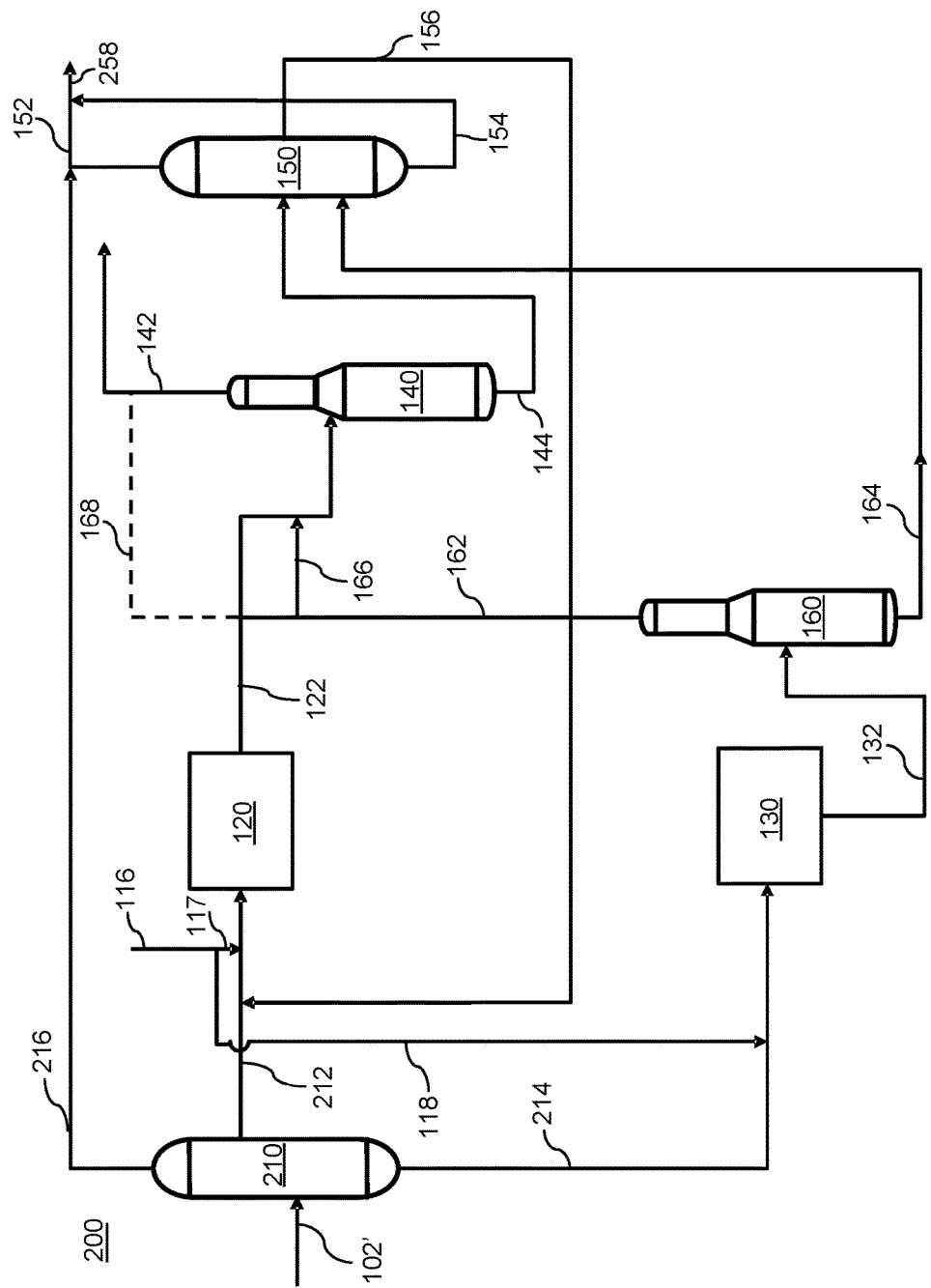
FIG. 2 is a schematic diagram of a process and an apparatus for isomerizing hydrocarbons in accordance with an exemplary embodiment.

Turning now to FIG. 2, another exemplary embodiment of the process and apparatus for isomerizing hydrocarbons is addressed with reference to a process and apparatus 200. Many of the elements in the FIG. 2 have the same configuration as in FIG. 1 and bear the same respective reference number and have similar operating conditions. Elements in FIG. 2 that correspond to elements in FIG. 1 but have a different configuration bear the same reference numeral as in FIG. 1 but are marked with a prime symbol ('). The apparatus and process in FIG. 2 are the same as in FIG. 1 with the exception of the noted following differences. In accordance with the exemplary embodiment as shown in the FIG. 2, the feed stream in line 102' may be passed to the de-isopentanizer column 210 to separate the feed stream. In accordance with the instant embodiment, the feed stream comprises $iC_5$ in the amount from about 10 wt % to about 30 wt %, or from about 10 wt % to about 40 wt %, or from about 10 wt % to about 50 wt %.

A first stream in a first line 212 rich in $C_5$ and $C_6$ hydrocarbons, a second stream in a second line 214 rich in benzene and $C_7$+ hydrocarbons and a third stream rich in $iC_5$ hydrocarbons is withdrawn in line 216 from the de-isopentanizer column 210. The first stream in a first line 212 may be passed to the isomerization zone 120 and the second stream may be passed to the benzene saturation reactor 130 and processed further as described in FIG. 1. Further, the third stream in line 216 may be passed to the de-isohexanizer overhead stream in line 152 to provide the isomerate product in line 258. Rest of the process is similar to as described in FIG. 1.

Applicants compared the instant flow scheme with a conventional flow-scheme wherein $C_7$ hydrocarbons and benzene are not separated and all the $C_5$, $C_6$ and $C_7$+ hydrocarbons are isomerized in a single isomerization separation. Table 1 illustrates the comparison with respect to 30000 barrels per stream day (BPSD) of feed including about 3 wt % $C_7$ hydrocarbons, about 3.5 wt % benzene, wherein a isomerate octane of 87.0 is obtained.

TABLE 1

|  | Conventional Flowscheme | Proposed Flowscheme |
|---|---|---|
| $C_5$+ Yield, wt % | 97.11 | 99.20 |
| Chemical $H_2$ Consumption, kg/hr | 534 | 478 |
| Total Reboiling Duty, MMbtu/hr | 185 | 180 |
| Combined Feed to Penex Reactor, BPSD | 40400 | 40860 |

As clear from the above table, using the proposed scheme, $C_5$+ yield increased from 97.11 wt % to about 99.20 wt % and the chemical hydrogen consumption is reduced from 534 kg/hr to 478 kg/hr.

Table 2 illustrates the comparison with respect to 9000 barrels per stream day (BPSD) of feed including about 13.2 wt % $C_7$ hydrocarbons, about 1.9 wt % benzene, wherein an isomerate octane of 88 is obtained.

TABLE 2

|  | Conventional Flowscheme | Proposed Flowscheme |
|---|---|---|
| $C_5$+ Yield, wt % | 93.45 | 96.13 |
| Chemical $H_2$ Consumption, kg/hr | 154 | 133 |
| Total Reboiling Duty, MMbtu/hr | 85 | 77 |
| Combined Feed to Penex Reactor, BPSD | 14800 | 16300 |

As clear from the above table, using the proposed scheme, $C_5$+ yield increased from 93.45 wt % to about 96.13 wt % and the chemical hydrogen consumption is reduced from 154 kg/hr to 133 kg/hr.

Further, it has been found that the instant flow scheme has a lower capital expenditure as compared a "$C_7$ recycle" isomerization scheme. In an exemplary "$C_7$ recycle" isomerization scheme, $C_5/C_6$ and $C_7$ hydrocarbons are isomerized separately in a $C_5/C_6$ isomerization zone and $C_7$ isomerization zone respectively, and employ a de-isohexanizer column for recycling the $C_6$ hydrocarbons to the $C_5/C_6$ isomerization zone and a de-isoheptanizer column for recycling $C_7$ hydrocarbons to a $C_7$ isomerization zone. As the proposed flow scheme does not require a big de-isoheptanizer column, two separate isomerization zones and an additional drier, the proposed flow-scheme results in substantial capital expenditure savings. Further, the proposed flow scheme as described above, has a lower liquid recycle across the unit resulting lower capital and operating expenditure. Further, as there is limited cracking of $C_7$+ hydrocarbons in the proposed flow scheme, $C_7$+ yield is about 99-100%, which is much higher than "$C_7$ Recycle" scheme and results in lower chemical hydrogen consumption.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is a process for isomerizing hydrocarbons, wherein the process comprises providing a feed stream comprising $C_5$, $C_6$ and $C_7$+ hydrocarbons; separating the feed stream to produce a first stream rich in $C_5$ and $C_6$ hydrocarbons and a second stream rich in benzene and $C_7$+ hydrocarbons; isomerizing the first stream in the presence of isomerization catalyst and hydrogen in an isomerization zone under isomerization conditions to produce a isomerized stream; and contacting the second stream with a benzene saturation catalyst at benzene saturation conditions to produce a saturation effluent stream comprising cyclohexane. An embodiment of the invention is one, any or all of prior embodiments in this paragraph up through the first embodiment in this paragraph, wherein separating the feed stream further comprises obtaining a third stream rich in $iC_5$ hydrocarbons. An embodiment of the invention is one, any or all of prior embodiments in this paragraph up through the first embodiment in this paragraph, wherein the feed stream comprises $iC_5$ in the amount from about 10 wt % to about 30 wt %. An embodiment of the invention is one, any or all of prior embodiments in this paragraph up through the first embodiment in this paragraph, wherein the feed stream comprises $C_7$+ hydrocarbons in the range of about 2 to about 20 wt %. An embodiment of the invention is one, any or all of prior embodiments in this paragraph up through the first embodiment in this paragraph further comprising passing the isomerized stream to a stabilizer to provide a stabilizer overhead stream comprising $C_4$- hydrocarbons and a stabilizer bottoms stream comprising branched hydrocarbons. An embodiment of the invention is one, any or all of prior embodiments in this paragraph up through the first embodiment in this paragraph further comprising passing the stabilizer bottoms stream to a de-isohexanizer column to provide an isomerate product. An embodiment of the invention is one, any or all of prior embodiments in this paragraph up through the first embodiment in this paragraph further comprising passing the saturation effluent stream to a stripper to provide a stripper overhead stream and a stripper bottoms stream. An embodiment of the invention is one, any or all of prior embodiments in this paragraph up through the first embodiment in this paragraph further comprising passing at least a portion of the stripper bottoms stream to the de-isohexanizer column. An embodiment of the invention is one, any or all of prior embodiments in this paragraph up through the first embodiment in this paragraph further comprising passing a de-isohexanizer side draw stream comprising cyclo-hexanes from the de-isohexanizer column to the isomerization zone. An embodiment of the invention is one, any or all of prior embodiments in this paragraph up through the first embodiment in this paragraph further comprising passing at least a portion of the stripper overhead stream to the stabilizer. An embodiment of the invention is one, any or all of prior embodiments in this paragraph up through the first embodiment in this paragraph further comprising passing at least a portion of the stripper overhead stream to the stabilizer overhead stream.

A second embodiment of the invention is a process for isomerizing hydrocarbons, wherein the process comprises providing a feed stream comprising $C_5$, $C_6$ and $C_7+$ hydrocarbons; separating the feed stream to produce a first stream rich in $C_5$ and $C_6$ hydrocarbons and a second stream rich in benzene and $C_7+$ hydrocarbons; isomerizing the first stream in the presence of isomerization catalyst and hydrogen in an isomerization zone under isomerization conditions to produce an isomerized stream; passing the isomerized stream to a stabilizer to provide a stabilizer overhead stream comprising $C_4-$ hydrocarbons and a stabilizer bottoms stream comprising branched hydrocarbons; contacting the second stream with a benzene saturation catalyst at benzene saturation conditions to produce a saturation effluent stream comprising cyclohexane; passing the saturation effluent stream to a stripper to provide a stripper overhead stream and a stripper bottoms stream; passing at least a portion of the stripper bottoms stream and the stabilizer bottoms stream to a de-isohexanizer column to provide an isomerate product and a de-isohexanizer side draw stream; and passing the de-isohexanizer side draw stream from the de-isohexanizer column comprising cyclo-hexanes to the isomerization zone. An embodiment of the invention is one, any or all of prior embodiments in this paragraph up through the second embodiment in this paragraph, wherein separating the feed stream further comprises obtaining a third stream rich in $iC_5$ hydrocarbons. An embodiment of the invention is one, any or all of prior embodiments in this paragraph up through the second embodiment in this paragraph, wherein the feed stream comprises $iC_5$ in the amount from about 10 wt % to about 30 wt %. An embodiment of the invention is one, any or all of prior embodiments in this paragraph up through the second embodiment in this paragraph, wherein the feed stream comprises $C_7+$ hydrocarbons in the range of about 2 to about 20 wt %. An embodiment of the invention is one, any or all of prior embodiments in this paragraph up through the second embodiment in this paragraph further comprising passing at least a portion of the stripper overhead stream to the stabilizer. An embodiment of the invention is one, any or all of prior embodiments in this paragraph up through the second embodiment in this paragraph further comprising passing at least a portion of the stripper overhead stream to the stabilizer overhead stream.

A third embodiment of the invention is an apparatus for isomerizing hydrocarbons, wherein the apparatus comprises a separation column in fluid communication with a feed stream comprising $C_5$, $C_6$ and $C_7+$ hydrocarbons to provide a first stream rich in $C_5$ and $C_6$ hydrocarbons in a first line and a second stream rich in benzene and $C_7+$ hydrocarbons in a second line; an isomerization zone in fluid communication with the first line for isomerizing the first stream in the presence of isomerization catalyst and hydrogen under isomerization conditions to produce a isomerized stream in an isomerate line; and a benzene saturation reactor in fluid communication with the second line for contacting the second stream with a benzene saturation catalyst at benzene saturation conditions to produce a saturation effluent stream in a saturation effluent line comprising cyclohexane. An embodiment of the invention is one, any or all of prior embodiments in this paragraph up through the third embodiment in this paragraph further comprising a stabilizer in fluid communication with the isomerate line for providing a stabilizer overhead stream in an stabilizer overhead line and a stabilizer bottoms stream in a stabilizer bottoms line; and a de-isohexanizer column in fluid communication with the stabilizer bottoms line to provide the isomerate product. An embodiment of the invention is one, any or all of prior embodiments in this paragraph up through the third embodiment in this paragraph further comprising a stripper in fluid communication with the saturation effluent line to provide a stripper overhead stream in a stripper overhead line and an stripper bottoms stream in a stripper bottoms line, the stripper bottoms line in fluid communication with the de-isohexanizer column.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Fahrenheit and, all parts and percentages are by weight, unless otherwise indicated.

The invention claimed is:

1. A process for isomerizing hydrocarbons, wherein the process comprises:
   providing a feed stream comprising $C_5$, $C_6$ and $C_7+$ hydrocarbons;
   separating the feed stream to produce a first stream rich in $C_5$ and $C_6$ hydrocarbons and a second stream rich in benzene and $C_7+$ hydrocarbons;
   isomerizing the first stream in the presence of an isomerization catalyst and hydrogen in an isomerization zone under isomerization conditions to produce an isomerized stream;
   contacting the second stream with a benzene saturation catalyst at benzene saturation conditions to produce a saturation effluent stream comprising cyclohexane;
   passing the saturation effluent stream to a stripper to provide a stripper overhead stream and a stripper bottoms stream;
   passing at least a portion of the stripper bottoms stream to a de-isohexanizer column; and
   passing a de-isohexanizer side draw stream comprising cyclo-hexanes from the de-isohexanizer column to the isomerization zone.

2. The process of claim 1, wherein separating the feed stream further comprises obtaining a third stream rich in isomerized $C_5$ hydrocarbons.

3. The process of claim 2, wherein the feed stream comprises isomerized $C_5$ hydrocarbons is in an amount from about 10 wt % to about 30 wt %.

4. The process of claim 1, wherein the feed stream comprises $C_7+$ hydrocarbons in a range of about 2 to about 20 wt %.

5. The process of claim 1 further comprising passing the isomerized stream to a stabilizer to provide a stabilizer overhead stream comprising $C_4-$ hydrocarbons and a stabilizer bottoms stream comprising branched hydrocarbons.

6. The process of claim 5 further comprising passing the stabilizer bottoms stream to the de-isohexanizer column to provide an isomerate product.

7. The process of claim 1 further comprising passing at least a portion of the stripper overhead stream to a stabilizer.

8. The process of claim 1, further comprising at least one of:
sensing at least one parameter of the process and generating a signal or data from the sensing;
generating and transmitting a signal; or
generating and transmitting data.

9. A process for isomerizing hydrocarbons, wherein the process comprises:
providing a feed stream comprising $C_5$, $C_6$ and $C_7+$ hydrocarbons;
separating the feed stream to produce a first stream rich in $C_5$ and $C_6$ hydrocarbons and a second stream rich in benzene and $C_7+$ hydrocarbons;
isomerizing the first stream in the presence of an isomerization catalyst and hydrogen in an isomerization zone under isomerization conditions to produce an isomerized stream;
passing the isomerized stream to a stabilizer to provide a stabilizer overhead stream comprising $C_4-$ hydrocarbons and a stabilizer bottoms stream comprising branched hydrocarbons;
contacting the second stream with a benzene saturation catalyst at benzene saturation conditions to produce a saturation effluent stream comprising cyclohexane;
passing the saturation effluent stream to a stripper to provide a stripper overhead stream and a stripper bottoms stream;
passing at least a portion of the stripper bottoms stream and the stabilizer bottoms stream to a de-isohexanizer column to provide an isomerate product and a de-isohexanizer side draw stream; and
passing the de-isohexanizer side draw stream from the de-isohexanizer column comprising cyclo-hexanes to the isomerization zone.

10. The process of claim 9, wherein separating the feed stream further comprises obtaining a third stream rich in isomerized $C_5$ hydrocarbons.

11. The process of claim 10, wherein the feed stream comprises isomerized $C_5$ hydrocarbons in an amount from about 10 wt % to about 30 wt %.

12. The process of claim 9, wherein the feed stream comprises $C_7+$ hydrocarbons in a range of about 2 to about 20 wt %.

13. The process of claim 9 further comprising passing at least a portion of the stripper overhead stream to the stabilizer.

14. The process of claim 9 further comprising passing at least a portion of the stripper overhead stream to the stabilizer overhead stream.

* * * * *

UNITED STATES PATENT AND TRADEMARK OFFICE
CERTIFICATE OF CORRECTION

PATENT NO. : 10,351,788 B1
APPLICATION NO. : 15/908738
DATED : July 16, 2019
INVENTOR(S) : Singh et al.

It is certified that error appears in the above-identified patent and that said Letters Patent is hereby corrected as shown below:

In the Claims

Column 11, Claim 3, Line 2: delete the word "is"

Signed and Sealed this
Ninth Day of June, 2020

Andrei Iancu
*Director of the United States Patent and Trademark Office*